United States Patent
Kautzky et al.

(10) Patent No.: US 9,620,152 B2
(45) Date of Patent: Apr. 11, 2017

(54) NEAR FIELD TRANSDUCERS (NFTS) AND METHODS OF MAKING

(71) Applicant: SEAGATE TECHNOLOGY LLC, Cupertino, CA (US)

(72) Inventors: Michael C. Kautzky, Eagan, MN (US); Mark H. Ostrowski, Lakeville, MN (US); David Michael Grundman, Shakopee, MN (US); Martin Blaber, Plymouth, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/167,622

(22) Filed: May 27, 2016

(65) Prior Publication Data

US 2016/0351214 A1 Dec. 1, 2016

Related U.S. Application Data

(60) Provisional application No. 62/167,320, filed on May 28, 2015.

(51) Int. Cl.
  *G11B 5/33* (2006.01)
  *G11B 11/00* (2006.01)
  (Continued)

(52) U.S. Cl.
  CPC .......... *G11B 5/3169* (2013.01); *G11B 5/3109* (2013.01); *G11B 2005/0021* (2013.01)

(58) Field of Classification Search
  CPC ............ G11B 5/314; G11B 2005/0021; G11B 2005/0005; G11B 5/3133; G11B 5/3136;
  (Continued)

(56) References Cited

U.S. PATENT DOCUMENTS

| 6,144,098 A | 11/2000 | Iyer |
| 7,773,330 B2 * | 8/2010 | Itagi ..................... G11B 5/1872 360/59 |

(Continued)

FOREIGN PATENT DOCUMENTS

| EP | 0580368 | 1/1994 |
| JP | 2011-008899 | 1/2011 |

(Continued)

OTHER PUBLICATIONS

Sato et al., "Evaluation of Adhesion Materials for Gold Line-and-Space Surface Plasmon Antenna on SO1-MOS Photodiode", Silicon Nanoelectronics Workshop (SNW), 2010, *IEEE*, Piscataway, NJ, USA, Jun. 13, 2010, pp. 1-2.

(Continued)

*Primary Examiner* — Nabil Hindi

(74) *Attorney, Agent, or Firm* — Mueting, Raasch & Gebhardt, P.A.

(57) ABSTRACT

Methods of forming a NFT the methods including forming a hard mask positioned over at least a portion of the rod, the hard mask including at least one layer; patterning a resist mask over the hard mask, the resist mask having an edge positioned over at least a portion of the rod; etching a portion of the hard mask to expose a back edge of the rod and to form a back edge of the hard mask, wherein the back edge of the rod is equivalent to the back edge of the peg; and wherein a forward portion of the rod which is the portion of the rod forward of the back edge is covered by the hard mask; forming a disc mask including a void configured to form a disc of a NFT, the disc mask being formed over at least a portion of the hard mask so that the exposed back edge of the rod is within the void configured to form the disc; etching an area exposed in the void of the disc mask to remove both a rear portion of the rod and the surrounding dielectric up to the back edge of the hard mask edge;

(Continued)

depositing a disc material in the etched void, wherein the back edge of the hard mask defines the front edge of the disc and the back edge of the rod is in contact with the front edge of the disc; and polishing the deposited disc material to form a top surface substantially planar with the top of the forward rod portion.

20 Claims, 8 Drawing Sheets

(51) Int. Cl.
*G11B 5/31* (2006.01)
*G11B 5/00* (2006.01)
(58) Field of Classification Search
CPC ... G11B 5/17; G11B 5/3903; G11B 11/10584; G11B 11/1058; G11B 11/10595; B82Y 26/00; B82Y 10/00
USPC ...... 360/59, 313, 125.32, 125.31; 369/13.32, 369/13.33, 13.53, 13.17, 13, 38, 13.24
See application file for complete search history.

(56) References Cited

U.S. PATENT DOCUMENTS

| | | |
|---|---|---|
| 8,040,761 B2 | 10/2011 | Kawamori |
| 8,149,657 B2 | 4/2012 | Huang |
| 8,248,897 B2 | 8/2012 | Shimazawa |
| 8,339,740 B2 | 12/2012 | Zou |
| 8,343,364 B1 | 1/2013 | Gao |
| 8,351,151 B2 | 1/2013 | Katine |
| 8,385,158 B1 | 2/2013 | Hu |
| 8,400,902 B2 | 3/2013 | Huang |
| 8,427,925 B2 | 4/2013 | Zhao |
| 8,599,656 B2 | 12/2013 | Jin |
| 8,773,956 B1 | 7/2014 | Wang |
| 8,787,129 B1 | 7/2014 | Jin |
| 8,790,527 B1 | 7/2014 | Luo |
| 8,830,800 B1 | 9/2014 | Pitcher |
| 8,934,198 B2 | 1/2015 | Zou |
| 8,971,161 B2 | 3/2015 | Cheng |
| 8,976,634 B2 | 3/2015 | Cheng |
| 9,058,824 B2 | 6/2015 | Cheng |
| 9,129,620 B2 | 9/2015 | Cheng |
| 9,263,074 B2 | 2/2016 | Huang |
| 9,281,003 B2 | 3/2016 | Zhao |
| 9,286,931 B2 | 3/2016 | Jayashankar |
| 2010/0104768 A1 | 4/2010 | Xiao |
| 2010/0123965 A1 | 5/2010 | Lee |
| 2010/0157745 A1 | 6/2010 | Okada |
| 2010/0214685 A1 | 8/2010 | Seigler |
| 2010/0321814 A1 | 12/2010 | Zou |
| 2010/0329085 A1 | 12/2010 | Kawamori |
| 2011/0002199 A1 | 1/2011 | Takayama |
| 2011/0096431 A1 | 4/2011 | Hellwig |
| 2011/0205863 A1 | 8/2011 | Zhao |
| 2011/0205864 A1 | 8/2011 | Huang |
| 2012/0105996 A1 | 5/2012 | Katine |
| 2012/0314549 A1 | 12/2012 | Lee |
| 2013/0100783 A1 | 4/2013 | Ostrowski |
| 2013/0107679 A1 | 5/2013 | Huang |
| 2013/0170332 A1 | 7/2013 | Gao |
| 2013/0235707 A1 | 9/2013 | Zhao |
| 2013/0279315 A1 | 10/2013 | Zhao |
| 2013/0288077 A1 | 10/2013 | Dhawan |
| 2013/0330573 A1 | 12/2013 | Zhao |
| 2014/0004384 A1 | 1/2014 | Zhao |
| 2014/0050058 A1 | 2/2014 | Zou |
| 2014/0251948 A1 | 9/2014 | Zhao |
| 2014/0254336 A1 | 9/2014 | Jandric |
| 2014/0307534 A1 | 10/2014 | Zhao |
| 2014/0313872 A1 | 10/2014 | Rawat |
| 2014/0376342 A1 | 12/2014 | Wessel |
| 2014/0376349 A1 | 12/2014 | Cheng |
| 2015/0063086 A1 | 3/2015 | Wierman |
| 2015/0117170 A1 | 4/2015 | Zhao |
| 2015/0131417 A1 | 5/2015 | Zhao |
| 2015/0340052 A1 | 11/2015 | Sankar |
| 2015/0380020 A1 | 12/2015 | Cheng |

FOREIGN PATENT DOCUMENTS

| | | |
|---|---|---|
| JP | 2013-122811 | 6/2013 |
| WO | WO 2013/163195 | 10/2013 |
| WO | WO 2013/163470 | 10/2013 |

OTHER PUBLICATIONS

Vogt, K.W. et al., "Characterization of Thin Titanium Oxide Adhesion Layers on Gold Resistivity, Morphology, and Composition", *Surface Science*, North-Holland, Amsterdam, NL, vol. 301, No. 1-3, Jan. 10, 1994, pp. 203-213.

Metallization: "Metallization"; chapter 5, In: Kris v. Srikrishnan and Geraldine C. Schwartz: "Handbook of Semiconductor Interconnection Technology, Second Edition", 2006, CRC Press, Boca Raton, FL, USA, XP002711255, ISBN:978-1-4200-1765-6, pp. 311-382, Section 5.4.1.2 Adhesion; p. 320.

PCT International Search Report and Written Opinion for PCT/US2016/034709 dated Aug. 24, 2016 (12 pages).

PCT International Search Report and Written Opinion for PCT/US2016/034615 dated Aug. 24, 2016 (13 pages).

\* cited by examiner

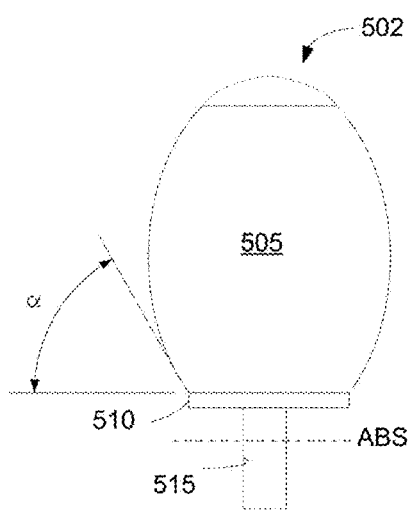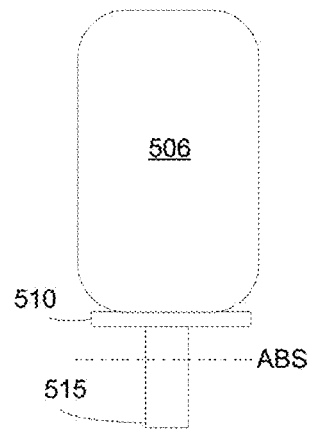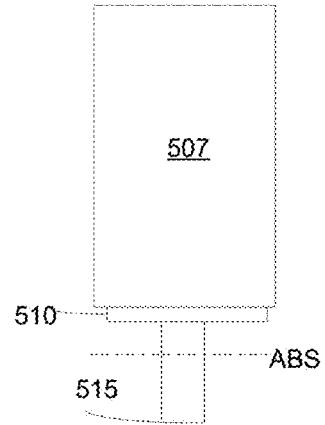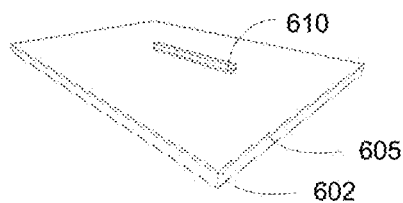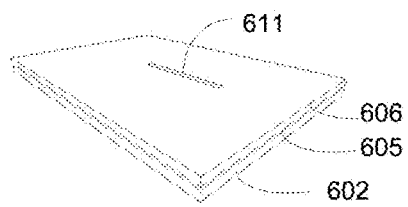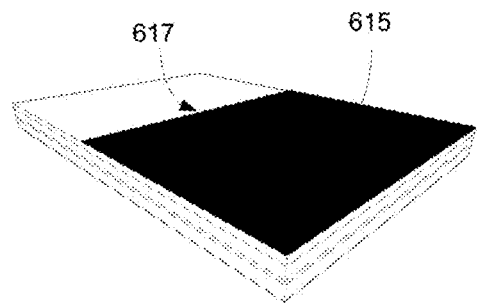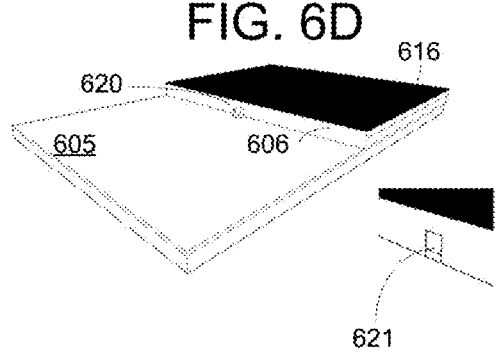

FIG. 7I
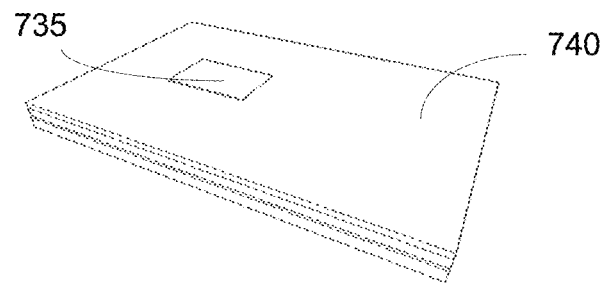
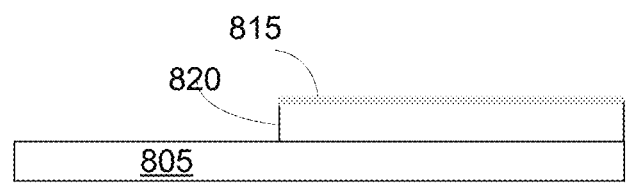
FIG. 8A
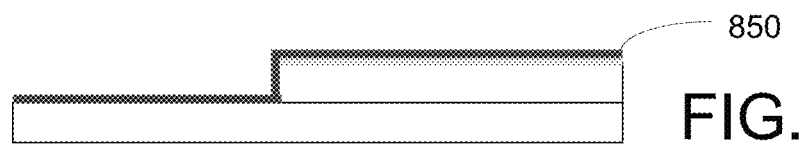
FIG. 8B
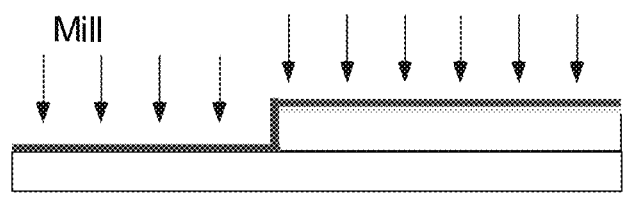
FIG. 8C
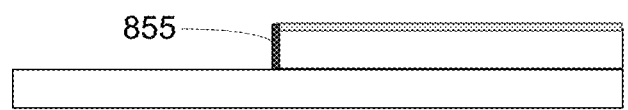
FIG. 8D

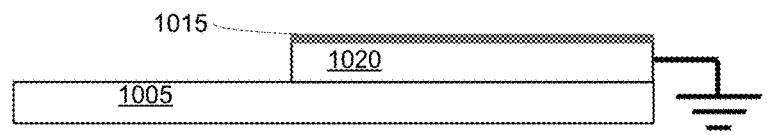
FIG. 10A
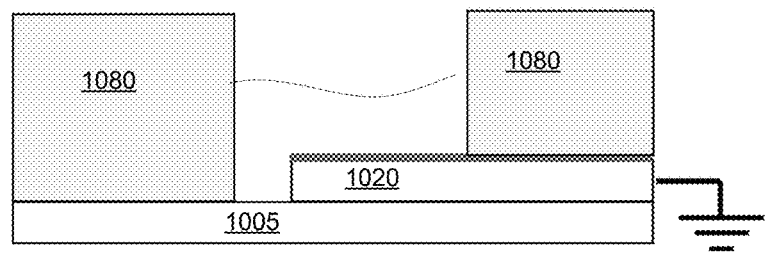
FIG. 10B
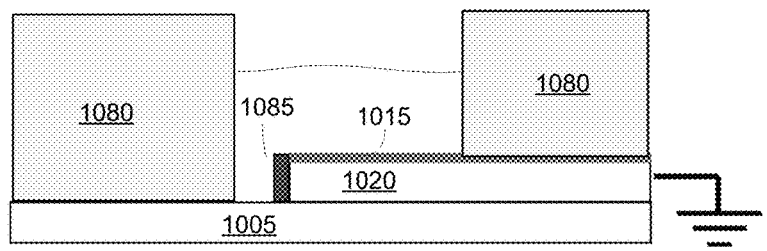
FIG. 10C
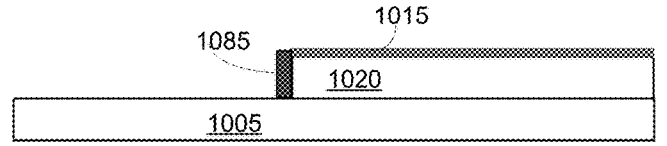
FIG. 10D
FIG. 11A
FIG. 11B
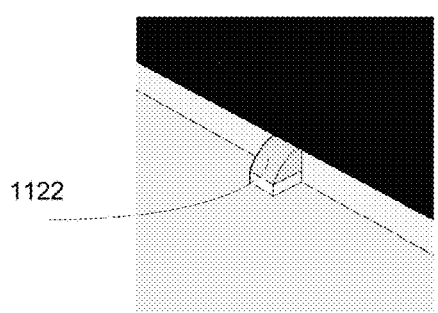
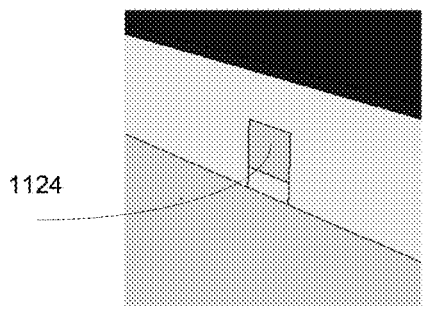

NEAR FIELD TRANSDUCERS (NFTS) AND METHODS OF MAKING

PRIORITY

This application claims priority to U.S. Provisional Applications No. 62/167,320 entitled, NEAR FIELD TRANSDUCERS (NFTS) AND ASSOCIATED STRUCTURES, filed on May 28, 2015 the disclosure of which is incorporated herein by reference thereto.

SUMMARY

Disclosed are methods of forming a NFT, the NFT including a disc and a peg, the peg being a portion of a rod, the method including forming the rod, the rod substantially surrounded on the sides by a dielectric material, the rod including the peg; forming a hard mask positioned over at least a portion of the rod, the hard mask including at least one layer; patterning a resist mask over the hard mask, the resist mask having an edge positioned over at least a portion of the rod; etching a portion of the hard mask to expose a back edge of the rod and to form a back edge of the hard mask, wherein the back edge of the rod is equivalent to the back edge of the peg; and wherein a forward portion of the rod which is the portion of the rod forward of the back edge is covered by the hard mask; forming a disc mask including a void configured to form a disc of a NFT, the disc mask being formed over at least a portion of the hard mask so that the exposed back edge of the rod is within the void configured to form the disc; etching an area exposed in the void of the disc mask to remove both a rear portion of the rod and the surrounding dielectric up to the back edge of the hard mask edge; depositing a disc material in the etched void, wherein the back edge of the hard mask defines the front edge of the disc and the back edge of the rod is in contact with the front edge of the disc; and polishing the deposited disc material to form a top surface substantially planar with the top of the forward rod portion.

Also disclosed are methods of forming a NFT, the NFT including a disc and a peg, the peg being a portion of a rod, the method including forming the rod, the rod substantially surrounded on the sides by a dielectric material, the rod including the peg; forming a hard mask positioned over at least a portion of the rod, the hard mask including at least one layer; patterning a resist mask over the hard mask, the resist mask having an edge positioned over at least a portion of the rod; etching a portion of the hard mask to expose a back edge of the rod and to form a back edge of the hard mask, wherein the back edge of the rod is equivalent to the back edge of the peg; and wherein a forward portion of the rod which is the portion of the rod forward of the back edge is covered by the hard mask; forming a disc mask including a void configured to form a disc of a NFT, the disc mask being formed over at least a portion of the hard mask so that the exposed back edge of the rod is within the void configured to form the disc; etching an area exposed in the void of the disc mask to remove both a rear portion of the rod and the surrounding dielectric up to the back edge of the hard mask edge; forming a barrier layer adjacent at least the back edge of the rod; depositing a disc material in the etched void, wherein the back edge of the hard mask defines the front edge of the disc and the back edge of the rod is in contact with the front edge of the disc; and polishing the deposited disc material to form a top surface substantially planar with the top of the forward rod portion.

Also disclosed are devices having air bearing surfaces (ABS), the devices including a NFT, the NFT including a disc having a front edge positioned towards the ABS of the device and an opposing back edge and a top surface and an opposing bottom surface; and a peg having a front surface adjacent the ABS of the device and an opposing back surface and a top surface and an opposing bottom surface, wherein the bottom surface of the peg is from about 5 nm to 20 nm above the bottom surface of the disc.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

FIGS. 5A to 5C are diagrams of illustrative disclosed NFTs.

FIGS. 6A to 6I depict structures during a disclosed illustrative process flow and FIG. 6J illustrates a possible resultant structure.

FIGS. 7A to 7I depict structures during a disclosed illustrative process.

FIGS. 8A to 8D show an illustrative process flow for forming an optional barrier layer.

FIGS. 10A to 10D show another illustrative process flow for forming an optional barrier layer.

FIGS. 11A and 11B are perspective diagrams illustrating different back surfaces of the peg that can be incorporated into disclosed NFTs formed herein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to data storage devices that utilize heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic media during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the paramagnetic effect.

A laser or other energy source may be directly (e.g., surface-attached) or indirectly (e.g., via optical fiber) coupled to a HAMR read/write head. An optical path (e.g., waveguide) is integrated into the read/write head and delivers the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head. The NFT may also be referred to as a plasmonic transducer, plasmonic antenna, near-field antenna, nano-disc, nano-patch, nano-rod, etc.

Generally, the NFT is formed by depositing a thin-film of material such as gold, silver, copper, etc., near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium.

Due to the intensity of the laser light and the small size of the NFT, the NFT and surrounding material are subject to a significant rise in temperature during writing. Over time, this can affect the integrity and/or reliability of the NFT, for example, causing it to become misshapen or recess. Other events, such as contact between the read/write head and recording medium, contamination, etc., may also degrade the operation of the NFT and nearby optical components. Degradation of the NFT will affect the effective service life of a HAMR read/write head. In view of this, methods and apparatuses described herein are used to increase the thermal robustness of the NFT, such as at a peg that extends towards the recording media.

Figure 1:
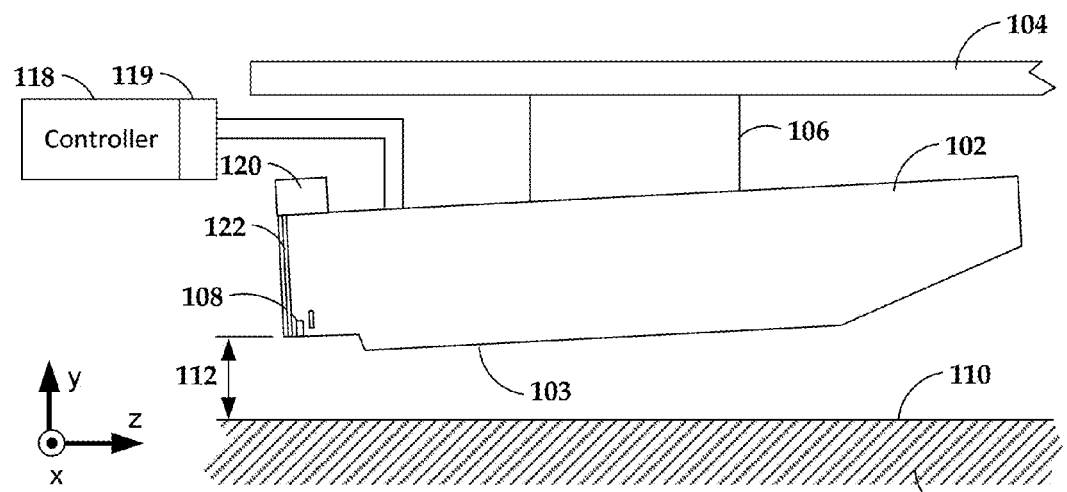
FIG. 1 is a block diagram of a hard drive slider and media arrangement according to an illustrative embodiment.

In reference now to FIG. 1, a block diagram shows a side view of a read/write head 102 according to an example embodiment. The read/write head 102 may be used in a magnetic data storage device, e.g., HAMR hard disc drive. The read/write head 102 may also be referred as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disc. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

A controller 118 is coupled to the read/write transducers 108, as well as other components of the read/write head 102, such as heaters, sensors, etc. The controller 118 may be part of general- or special-purpose logic circuitry that controls the functions of a storage device that includes at least the read/write head 102 and recording medium 111. The controller 118 may include or be coupled to interface circuitry 119 such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hot spot on the recording medium 111 near the read/write transducer 108. These components include laser 120 (or other energy source) and waveguide 122. The waveguide 122 delivers light from the laser 120 to components near the read/write transducers 108. These components are shown in greater detail in FIG. 2, which is a block diagram illustrating a cross-sectional view of the read/write head 102 according to an example embodiment.

Figure 2:
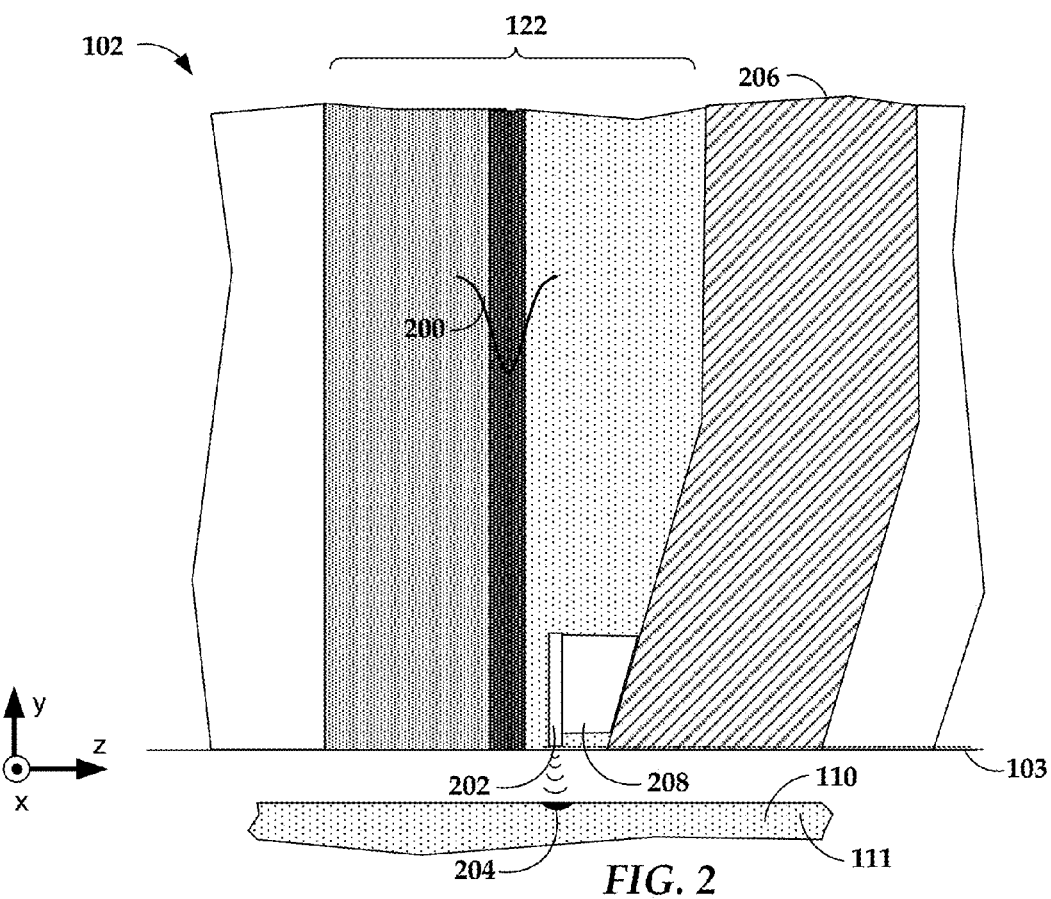
FIG. 2 is a cross-sectional view of a read/write head according to an illustrative embodiment.

As shown in FIG. 2, the waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The energy 200 applied to the near-field transducer 202 to create the hotspot 204 can cause a significant temperature rise in a local region near the media-facing surface 103. The near-field transducer 202 may include a heat sink 208 that draws away some heat, e.g., to the write pole 206 or other nearby heat-conductive component. Nonetheless, the temperature increase near the near-field transducer 202 can be significant, leading to degradation of the near-field transducer 202 and other components over time. As such, techniques described herein facilitate increasing thermal robustness of the near-field transducer.

Figure 3:
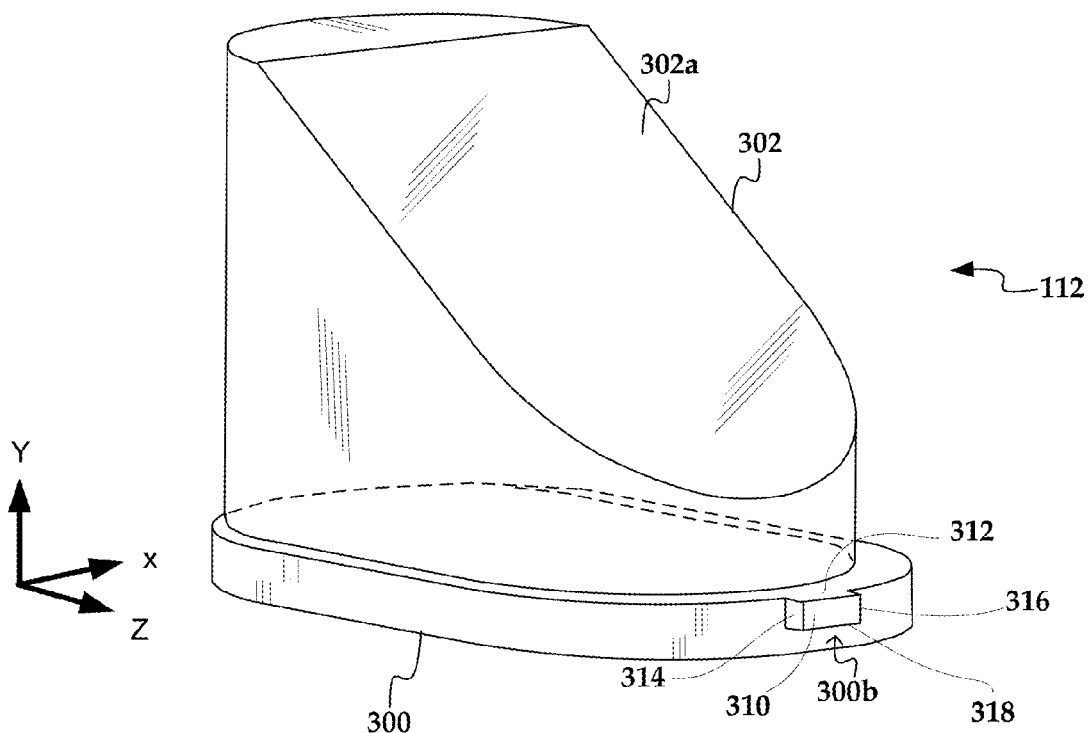
FIG. 3 is a perspective view of a near field transducer according to an illustrative embodiment.

In FIG. 3, a perspective views show details of a device 112 including a NFT. The device 112 can include two parts: a disc 300 and a heat sink 302 proximate to (e.g., deposited directly on to) the disc 300. In this example, the outline of the disc 300 on the xz-plane (which is a substrate-parallel plane) is enlarged relative to the heat sink 302, although they may be the same size. The heat sink 302 can include an angled surface 302a that is located proximate to a write pole (see, e.g., write pole 206 in FIG. 2).

The disc 300 acts as a collector of optical energy from a waveguide and/or focusing element. The disc 300 achieves surface plasmon resonance in response to the optical energy and the surface plasmons are directed to the medium via a peg 300b that extends from the disc 300. It should be noted that the heat sink may also contribute to the energy transfer process and in some such embodiments a NFT does not necessarily include a separate disc and heat sink but a single component that can act as both. In this example, the disc 300 is configured as an elongated plate with rounded (e.g., circular) ends, also referred to as a stadium or capsule shape. Other enlarged portion geometries may be used, including circular, rectangular, triangular, etc.

Figure 4:
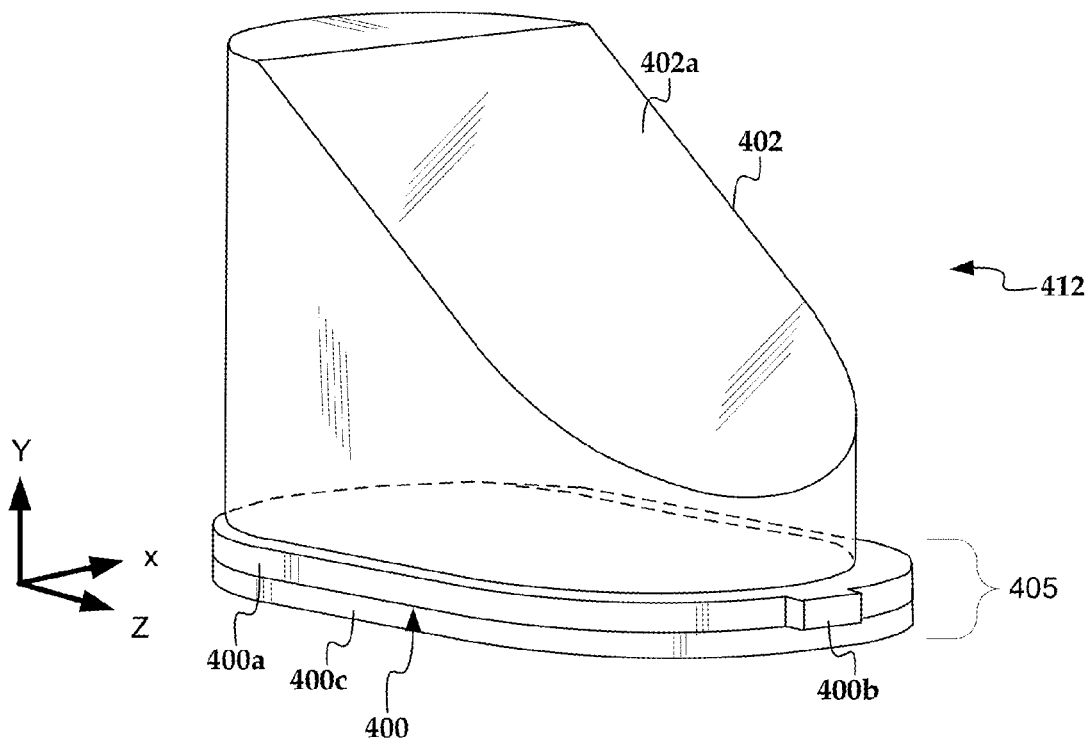
FIG. 4 is a perspective view of a near field transducer according to an illustrative embodiment.

In FIG. 4, a perspective views show details of a device 412 according to an example embodiment. The device 412 includes a NFT 405 and a heat sink 402 proximate to (e.g., deposited directly on to) the disc 400 of the NFT 405. In this example, the outline of the disc 400 on the xz-plane (which is a substrate-parallel plane) is enlarged relative to the heat sink 402, although they may be the same size. The heat sink 402 includes an angled surface 402a that is located proximate to a write pole (see, e.g., write pole 206 in FIG. 2).

The disc 400 includes a top disc 400a that acts as a collector of optical energy from a waveguide and/or focusing element. The top disc 400a achieves surface plasmon resonance in response to the optical energy and the surface plasmons are directed to the medium via a peg 400b that extends from top portion 400a. In this example, the top portion 400a is configured as an elongated plate with rounded (e.g., circular) ends, also referred to as a stadium or capsule shape. Other enlarged portion geometries may be used, including circular, rectangular, triangular, etc.

The disc 400 also includes a bottom disc 400c. The bottom disc 400c can also be referred to as a sunken disc. The term "sunken disc" refers to a base or bottom portion that extends below the peg, as shown by the base portion 400c in FIG. 3. This can also be described as the peg extending beyond the bottom disc 400c. In some embodiments, such as that depicted in FIG. 4, the bottom disc 400c and the top disc 400a can have the same outline shape (e.g., stadium shape) as well as a same outline size. In some embodiments, the bottom disc 400c and the top disc 400a can have different outline shapes, different outline sizes, or combinations thereof. The peg 400b extends beyond the bottom disc 400c. The bottom portion 400c is disposed proximate a light delivery structure (e.g., a waveguide core) and away from a write pole. In some embodiments, the bottom disc 400c may likely be, but need not be, the primary collector of optical energy.

Disclosed NFTs and methods of formation thereof may include or form discs that may have advantageous properties. For example, disclosed formation processes may reduce variability due to critical dimension and overlay placement errors that are present in other methods because of the use of photolithography methods. Such variability can impact the coupling efficiency between the disc and the peg, the performance of the NFT, or combinations thereof. Additionally or alternatively, disclosed formation processes may result in lower rates of rework on devices. Additionally or alternatively, disclosed formation processes may also result in higher density, better microstructure, or combinations thereof in the deposited discs. Additionally or alternatively, disclosed formation processes may also result in decreased failures due to peg-disc separation. Additionally or alternatively, disclosed NFTS and methods of forming them may more easily or simply allow use of better aligned diffusion barriers. Additionally or alternatively, disclosed NFTs may allow for higher areal densities due to more favorable aspect ratios in the rod. Additionally or alternatively, disclosed NFTs or methods of forming NFTs can remove the need to mill the rod which removes a portion of the core to NFT space (CNS) cladding, which can lead to an increase in the NFT temperature. Some embodiments of disclosed NFTs or methods of forming NFTs may impart one or more of these properties or advantages to the overall device.

FIGS. 5A to 5C are diagrams of illustrative NFTs. For example, the NFTs can include a peg 515, a barrier layer 510 and a disc 505 (FIG. 5A), 506 (FIG. 5B) and 507 (FIG. 5C). It should be noted that embodiments are also included herein where the barrier layer 510 is not present and the back edge of the peg 515 is in contact with the front edge of the disc 505. The disc 505 in FIG. 5A could include the flattened back edge (opposite the ABS), as indicated by the solid line or could include a rounded back edge, as indicated by the dashed line. In some embodiments, the flattened back edge may advantageously improve the critical dimension of the overall NFT. The NFT in FIG. 5B includes a disc 506 that has an overall rectangular (as opposed to general elliptical or stadium like as in FIG. 5A) shape but includes rounded corners. The NFT in FIG. 5C includes a disc 507 that has a substantially rectangular shape. In some embodiments, rounded corners, such as the depicted in FIG. 5B may be advantageous because they can minimize or even avoid the electric field concentrating on such corners. In contrast, sharp corners may concentrate the electric field and may therefore get hot and then act as a sacrificial void sink. Furthermore, tapering the disc 507 in FIG. 5C so that it is narrower towards the ABS may have some performance advantages. The core geometry of the disc can be chosen so as to accommodate the excitation of surface plasmons on the discs. Specifics regarding the size or dimensions of the disc can also be chosen so as to accommodate the light that exits the waveguide.

Disclosed NFTs can include various materials disclosed herein as well as those disclosed elsewhere. In some embodiments the peg and the disc can be made of the same material and in some embodiments the peg and the disc can be made of different materials. In some embodiments, either the peg or the disc or both can include more than one part that may be made of different materials.

In some embodiments, the peg, the disc, the heat sink, or any combination thereof can include aluminum (Al), antimony (Sb), bismuth (Bi), chromium (Cr), cobalt (Co), copper (Cu), erbium (Er), gadolinium (Gd), gallium (Ga), gold (Au), hafnium (Hf), indium (In), iridium (Ir), iron (Fe), manganese (Mn), molybdenum (Mo), nickel (Ni), niobium (Nb), osmium (Os), palladium (Pd), platinum (Pt), rhenium (Re), rhodium (Rh), ruthenium (Ru), scandium (Sc), silicon (Si), silver (Ag), tantalum (Ta), tin (Sn), titanium (Ti), vanadium (V), tungsten (W), ytterbium (Yb), yttrium (Y), zirconium (Zr), or combinations thereof. Illustrative examples of materials for the peg, the disc, the heat sink, or any combinations thereof can include binary and/or ternary alloys including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include lanthanides, actinides, or combinations thereof including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include dispersions including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include alloys or intermetallics based on or including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative alloys or intermetallics can include, for example binary and ternary silicides, nitrides, and carbides. For example vanadium silicide (VSi), niobium silicide (NbSi), tantalum silicide (TaSi), titanium silicide (TiSi), palladium silicide (PdSi) for example zirconium nitride (ZrN), aluminum nitride (AlN), tantalum nitride (TaN), hafnium nitride (HfN), titanium nitride (TiN), boron nitride (BN), niobium nitride (NbN), or combinations thereof. Illustrative carbides can include, for example silicon carbide (SiC), aluminum carbide (AlC), boron carbide (BC), zirconium carbide (ZrC), tungsten carbide (WC), titanium carbide (TiC) niobium carbide (NbC), or combinations thereof. Additionally doped oxides can also be utilized. Illustrative doped oxides can include aluminum oxide (AlO), silicon oxide (SiO), titanium oxide (TiO), tantalum oxide (TaO), yttrium oxide (YO), niobium oxide (NbO), cerium oxide (CeO), copper oxide (CuO), tin oxide (SnO), zirconium oxide (ZrO) or combinations thereof. Illustrative examples of materials for the peg, the disc, the heat sink, or any combinations thereof can include conducting oxides, conducting nitrides or combinations thereof of various stoichiometries where one part of the oxide, nitride or carbide includes Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include a metal including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr doped with oxide, carbide or nitride nanoparticles. Illustrative oxide nanoparticles can include, for example, oxides of yttrium (Y), lanthanum (La), barium (Ba), strontium (Sr), erbium (Er), zirconium (Zr), hafnium (Hf), germanium (Ge), silicon (Si), calcium (Ca), aluminum (Al), magnesium (Mg), titanium (Ti), cerium (Ce), tantalum (Ta), tungsten (W), thorium (Th), or combinations thereof. Illustrative nitride nanoparticles can include, for example, nitrides of zirconium (Zr), titanium (Ti), tantalum (Ta), aluminum (Al), boron (B), niobium (Nb), silicon (Si), indium (In), iron (Fe), copper (Cu), tungsten (W), or combinations thereof. Illustrative carbide nanoparticles can include, for example carbides of silicon (Si), aluminum (Al), boron (B), zirconium (Zr), tungsten (W), titanium (Ti), niobium (Nb), or combinations thereof. In some embodiments nanoparticles can include combinations of oxides, nitrides, or carbides. It is to be understood that lists of combinations of elements are not exclusive to monoatomic binary combinations, for example VSi is taken to include $V_2Si$ and $VSi_2$, for example.

In some embodiments the disc may include copper (Cu), silver (Ag), aluminum (Al), tantalum (Ta), gold (Au), or combinations thereof. In some embodiments the disc may include AlTi, ZrN, TiN, or combinations thereof. In some embodiments the disc may include gold based materials, including for example, AuBi, AuBiC, AuY, AuYO, AuHf, AuHfO, AuLaO, AuZrO, or combinations thereof.

In some embodiments where the disc includes a gold alloy, the non-gold element(s) of the alloy may be introduced into the Au disc via co-sputtering, layer-by-layer deposition, layer-by-layer deposition with oxygen, via ion implant, via nanoparticle inclusion, or any combination thereof. The presence of the alloyed substituent may serve to arrest grain growth, stabilize grain boundaries, stabilize interfaces, increase melting point, improve interface adhesion, or some combination thereof. In some embodiments, the resulting film is greater than 50 atomic percent gold. The permittivities of these materials range from $\in=(-15+5i)$ to $\in=(-40+3i)$ depending on the exact composition and materials. In some embodiments, gold-based materials or gold alloys where the non-gold component(s) make up, in total, less than 10 atomic percent of the disc can be utilized. In some embodiments, the disc can include AuBiC, AuY, AuYO, or AuZrO, for example, where the non-gold component comprises less than 5 atomic percent of the disc. Discs with this level of non-gold constituents may provide improved mechanical properties with the least impact on the permittivity compared to gold.

In some embodiments, the peg may include gold (Au), silver (Ag), copper (Cu), zirconium (Zr), tantalum (Ta), aluminum (Al), palladium (Pd), platinum (Pt), nickel (Ni), cobalt (Co), iridium (Ir), rhodium (Rh), or combinations thereof. In some embodiments, the peg may include ZrN, AlTi, NiFe, or combinations thereof.

In some embodiments, materials that have a real permittivity less than −10 (at a wavelength of 830 nm) can be used as a peg material. In some embodiments, materials with either (exclusively either) low imaginary permittivity, or very large absolute real and very large absolute imaginary permittivity can be utilized for the peg material. In the case of low imaginary permittivity, imaginary permittivity may be traded for mechanical robustness. For example, silver has imaginary permittivity <1, indicating very low loss, but is not mechanically or thermally robust, nor resistant to corrosion, whereas ZrN and Ta are mechanically robust and have imaginary permittivity less than 15. Materials with large absolute real permittivity and large imaginary permittivity may also be advantageous as peg materials as they suffer less from heating. Illustrative examples can include Al, Rh, NiFe, AlTi and Ir. In some embodiments, materials that are hard, mechanically robust, resistant to oxidation, have high melting temperature, large absolute permittivity, or combinations thereof may be utilized. Illustrative examples can include Rh and Ir.

In some embodiments, at least some portion of the optional barrier layer or more than one portion of the optional barrier layer can independently be selected from bismuth (Bi), arsenic (As), gallium (Ga), germanium (Ge), tellurium (Te), lead (Pb), antimony (Sb), indium (In), tin (Sn), cadmium (Cd), thallium (Tl) silver (Ag), palladium (Pd), platinum (Pt), rhodium (Rh), iridium (Ir), osmium (Os), ruthenium (Ru), technetium (Tc), rhenium (Re), mercury (Hg), chromium (Cr), manganese (Mn), iron (Fe), cobalt (Co), nickel (Ni), copper (Cu), zinc (Zn), tungsten (W), niobium (Nb), or combinations thereof. In some embodiments, at least some portion of the optional barrier layer or more than one portion of the optional barrier layer can independently be selected from an alloy. Illustrative, specific alloys can include, for example CoFe, NiFe, NiCu, CdTe, $Sn_2Te_3$, PbSe, $Bi_2Te_3$, NiP, NiWP, NiMoP, NiW, and NiMo. In some embodiments, at least some portion of the optional barrier layer or more than one portion of the optional barrier layer can independently be selected from semi-metal oxides, sulfides or combinations thereof. Illustrative semi-metal oxides and sulfides can include, for example $Bi_2O_3$, ZnO, $TeO_2$, CuO, InO, $SnO_2$, SmZnO, CdS, ZnS, HgS, $Bi_2S_3$, SnS, $In_2S_3$ and PbS. In some embodiments, at least some portion of the optional barrier layer or more than one portion of the optional barrier layer thereof can independently be selected from rhodium (Rh), ruthenium (Ru), iridium (Ir), tungsten (W), niobium (Nb), alloys thereof or compounds thereof. An example of a specific compound can include nickel phosphate (NiP), for example.

In some embodiments, the optional barrier layer or more than one portion of the optional barrier layer can include a material that has a relatively large absolute real permittivity and relative large imaginary permittivity. Such materials may suffer less from heating. Illustrative materials can include, for example aluminum (Al), rhodium (Rh), iridium (Ir), or combinations thereof. Illustrative materials can also include, for example nickel iron (NiFe), aluminum titanium (AlTi), or combinations thereof. In some embodiments, illustrative materials can include, for example those that are relatively hard, relatively mechanically robust, relatively resistant to oxidation, have relatively high melting temperature, relatively large absolute permittivity, relatively low solubility with the disc and peg materials, or combinations thereof. Illustrative examples of such materials can include, for example rhodium (Rh) and iridium (Ir).

It should also be noted that the intersection angle, denoted in FIG. 5A as α can be virtually any angle. In some embodiments, such as that depicted in FIGS. 5A and 5B, α can be not greater than 90°, while in other embodiments (not depicted in the figures), a can be not less than 90°. In some specific illustrative embodiments, a can be not less than 30° for example and not greater than 90°.

Some embodiments of NFTs, including those illustrated in FIGS. 5A to 5C may share at least some properties. For example, discs, especially those formed using disclosed methods (discussed below) are milled from a sheet film of material instead of deposited into a via. This can enable hot deposition of the disc material which may lead to improved densities, reduced shadowing, or combinations thereof. Another example of a feature that may be shared by discs in disclosed NFTs and NFTs made using disclosed methods includes a flat front (towards the ABS) edge, no overlap of the disc and rod, or combinations thereof. Such features can improve breakpoint control. By using a mask that contains a nominally straight portion, the flat front edge of the disc can be positioned accurately and precisely. Control of the position of the front edge of the disc may give greater control over the distance between the disc and the ABS, e.g., the length of the peg, or peg break point. Both reliability and performance of the head may be dependent, at least in part, on the length of the peg, therefore controlling the length can be advantageous. Another example of a feature that may be shared by discs in disclosed NFTs and NFTs made using disclosed methods includes the ability to integrate a barrier between the peg and the disc. Use of a barrier between the peg and the disc may minimize or even prevent the peg from recessing during operation. Yet another example of a feature that may be shared by discs in disclosed NFTs and NFTS made using disclosed methods includes favorable aspect ratios of the rod, which ultimately forms the peg. In some embodiments, the aspect ratio can even be less than 1:1 in the cross track direction.

FIGS. 6A to 6I illustrate a structure at various stages of fabrication in an illustrative disclosed process.

Figure 6E:
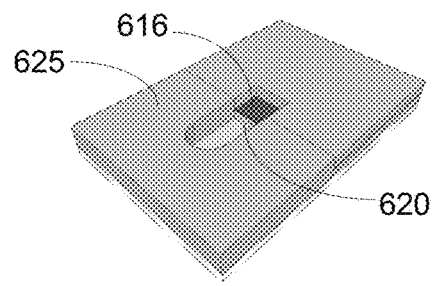

A first step in disclosed methods can include forming a peg or a rod including a peg. Formation of a peg can be accomplished using many different processes and many different methods. In the process scheme disclosed in FIGS. 6A to 6I, the peg, once formed has dielectric material surrounding it. Therefore, methods of forming the peg that are incorporated into methods of FIGS. 6A to 6I generally begin by forming a peg that is surrounded by dielectric. One illustrative method includes depositing peg material on a dielectric layer and utilizing various removal and patterning methods to form a peg. The steps depicted in FIGS. 6A and 6B are one example of a specific illustrative method of forming a peg. FIG. 6A shows the structure after a peg structure 610 has been formed on a substrate 602 that has a first dielectric material 605 deposited thereon. The peg structure can be formed using any deposition, patterning, removal, etc. techniques known to those of skill in the art including photolithography methods, removal methods, etc. Depending on the method utilized, an area around the peg may have to be backfilled with the dielectric material. This step defines the width of the rod and ultimately the peg.

FIG. 6B shows the structure after the peg (or the rod including the peg) has been subjected to chemical mechanical polishing (CMP) to form a peg 611 that is generally surrounded by, at least on the sides or be substantially surrounded by at least on the sides by (e.g., can be substantially planar with) dielectric material. The peg/rod can also be, at this point, as being fully encapsulated, be open above the rod/peg (e.g., open top), be open above the rod and have slightly exposed side tops (e.g., from peg protrusion during CMP, for example). The structure in FIG. 6B also includes a second layer 606 of dielectric material (which may be the same or different than that of 605). This step may be used to define the final height of the rod/peg. Such a method of defining the rod height may be advantageous because the rod is patterned and etched from a planarized surface. Furthermore, adding the backfill (606) and CMP steps may allow the depth of the bottom (sunken) disc to no longer be defined by a peg overmill (not shown) which can be difficult to control due to material selectivity during milling or other removal processes. This may allow for the sunken disc depth to be optimized independent of rod/peg processing.

As noted above, there are alternatives to the method of forming the peg/rod depicted in FIGS. 6A and 6B. One possible alternative includes forming a trench in a layer of dielectric material, where the trench is configured in the same way the rod should be once formed. This trench can then be filled with the material of the peg. The entire structure could then be subjected to CMP to obtain a planar surface. Another possible alternative includes forming a trench in a layer of dielectric material, where the trench is configured in the same way the rod should be once formed. This trench can then be filled with the material of the peg. The entire structure could then be subjected to milling, such as an angled milling to remove the excess peg material.

FIG. 6C shows the structure after a hard mask has been deposited, patterned and etched. The resultant structure includes a processed hard mask 615. The back edge 617 of the processed hard mask 615 defines the position of the back edge of the rod and the back edge of the rod ultimately defines the front edge of the disc. Defining this edge in such a way can be advantageous because it provides a single edge on a flat surface and furthermore use of a thin resist and a hard mask results in relatively low overlay errors. This edge is one way of enabling the flat, no overlap nature of the peg 515/optional barrier layer 510/disc 505 in FIG. 5A. The hard mask need not cover the entire rod, as subsequent steps can remove any excess that is apparent outside of the masked area (the overhang 620 in FIG. 6D is present because of the particular mill process in the next step, rather than due to the positioning of the hard mask).

FIG. 6D shows the structure after it has been etched to expose the back edge 620 of the rod. An exposed portion of the second layer 606 of dielectric material is also exposed adjacent the back edge 620 of the rod. The inset in FIG. 6D show the rod 621 in greater detail adjacent the second layer 606 of the dielectric. It should be noted that the rod 620 in the larger figure is shown with a curved surface and the rod 621 in the inset is shown with a flat surface. Further properties of both of these and methods of forming are discussed below with respect to FIGS. 11A and 11B. This step may offer advantages because the etch can be controlled so that there is relatively little undesired removal of the underlying cladding (e.g., the core to NFT space or "CNS"). This step can either be accomplished with no redeposition of material on the face of the rod or the face of the rod can optionally be cleaned to ensure that no material has been redeposited thereon. The mill conditions and materials selection can be chosen so as to arrive at 620 or 621. A back edge similar to 620 may offer a better thermal/mechanical connection between the rod and disc, which may offer an advantage. Alternatively, a back edge similar to 621 may offer advantages in the performance of the resulting device and optionally the ease of integration of a barrier layer.

FIG. 6E shows the structure after a disc mask 625 has been formed thereon. The disc mask 625 can be formed using known photolithography techniques, for example. The disc mask 625 has a configuration depending on the desired configuration of the disc being formed. It should be noted that the disc mask 625 is positioned such that the back edge 620 of the rod is located within the exposed (non-masked) area. A portion of the underlying hard mask 616 is also positioned within the disc mask 625. It should also be noted that additional masking steps (or other types of steps) can also be added in order to provide further definition of the shape of the disc. Such steps could be undertaken at this point, at other points, or any combination thereof. Specific, illustrative examples of such further definition could include, for example removing sharp corners or rounding said corners or narrowing of the disc toward the ABS.

Figure 6F:
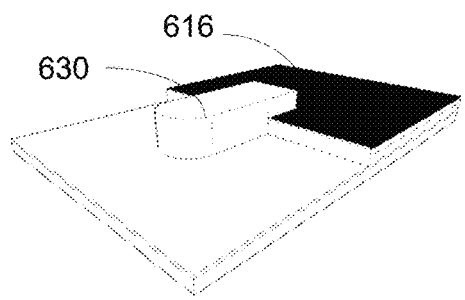

FIG. 6F shows the structure after the disc material 630 has been deposited into the disc mask 625 and the disc mask 625 has been removed. The deposition of the disc material 630 can be accomplished using known techniques. Removal of the disc mask 625 can be accomplished using known removal methods for photoresist, for example.

Figure 6G:
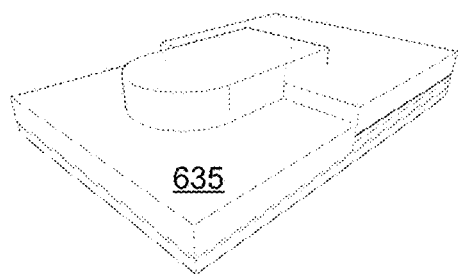

FIG. 6G shows the structure after a second dielectric material 635 has been deposited thereon. The second dielectric material 635 can be deposited on any convenient portion of the field. This dielectric material will eventually form the NFT to pole space or "NPS". Illustrative dielectric materials can include, for example oxides such as $Al_2O_3$, $Ta_2O_5$, etc. It should also be noted that the first dielectric material 605 on which the peg was deposited in the step depicted in FIG. 6A is also a dielectric material and the two can but need not be the same material. The first dielectric material 605 can ultimately form the core to NFT space or "CNS".

Figure 6H:
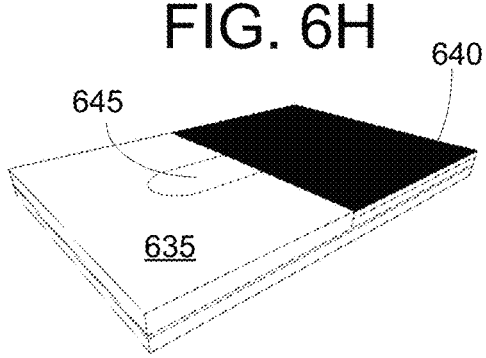

FIG. 6H shows the structure after it has been subjected to a removal method, for example CMP. In some embodiments, CMP can be utilized and the CMP process can be configured to stop at the hard mask 640, as seen in FIG. 6H. This step exposes the upper surface of the disc 645 which is surrounded by the exposed dielectric material 635.

Figure 6I:
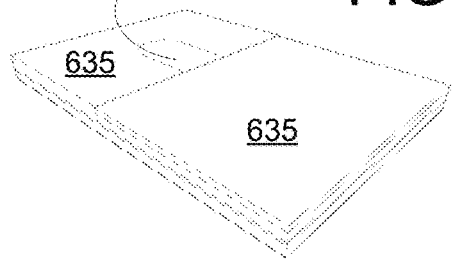
Figure 6J:
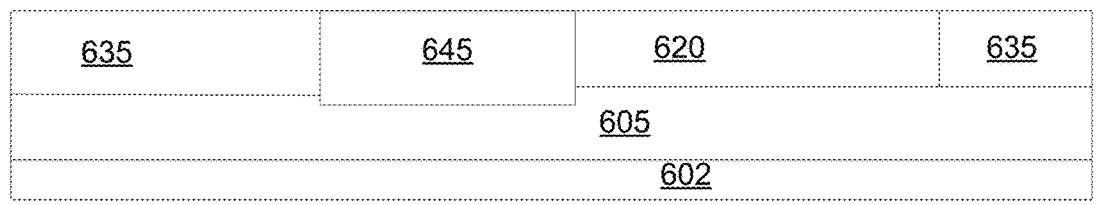

FIG. 6I shows the structure after the exposed hard mask 640 has been removed. At this point, the disc 645 is entirely surrounded at this plane by dielectric material 635. FIG. 6J shows a cross section of the structure that includes a substrate 602, a first dielectric material 605, a second dielectric material 635, a disc 645 and a peg 620. It can be noted in FIG. 6J that the bottom (the surface closest to the substrate) of the peg 620 sits above the bottom of the disc 645. In some embodiments, the distance between the bottom of the peg and the bottom of the disc can be from 0 nm (they are at the same level) to 30 nm, or in some embodiments from 5 nm to 20 nm, for example.

In some embodiments, the steps depicted from FIG. 6C to 6E could also be undertaken using a multilayer hard mask that does not include photoresist to form a via that functions like the void in the disc mask 625 of FIG. 6E. Known processing steps (e.g., masking, milling, patterning, etching, photoresist stripping, etc.) and materials (e.g., multilayer hard masks including various materials) can be utilized to form a void similar to that seen in FIG. 6E. The advantage of such a method over that depicted in FIGS. 6C to 6E may be that the material of the disc can be deposited using relatively higher deposition temperatures (as compared with those that can be used when regular photoresist is present in the structure) which may lead to a disc that is more dense, more uniform, or combinations thereof. Other advantages of this type of process may include a low profile (aspect ratio is small, disc is wide, long in the plane and short in the deposition direction), which may be advantageous for the deposition fill process. Also the X dimension control of the disc (width perpendicular to the rod) may be better than when depositing into a photoresist.

In some embodiments, a specific illustrative method of forming a NFT can include steps of forming a rod, the rod substantially surrounded on the sides by a dielectric material, the rod including the peg; forming a hard mask positioned over at least a portion of the rod, the hard mask including at least one layer; patterning a resist mask over the hard mask, the resist mask having an edge positioned over at least a portion of the rod; etching a portion of the hard mask to expose a back edge of the rod and to form a back edge of the hard mask, wherein the back edge of the rod is equivalent to the back edge of the peg; and wherein a forward portion of the rod which is the portion of the rod forward of the back edge is covered by the hard mask; forming a disc mask comprising a void configured to form a disc of a NFT, the disc mask being formed over at least a portion of the hard mask so that the exposed back edge of the rod is within the void configured to form the disc; etching an area exposed in the void of the disc mask to remove both a rear portion of the rod and the surrounding dielectric up to the back edge of the hard mask edge; depositing a disc material in the etched void, wherein the back edge of the hard mask defines the front edge of the disc and the back edge of the rod is in contact with the front edge of the disc; and polishing the deposited disc material to form a top surface substantially planar with the top of the forward rod portion.

Optionally, the disc mask can be removed after the disc material has been deposited in the void. Optionally a second dielectric material can be deposited over at the disc material after the disc mask has been removed. Optionally at least a portion of the disc material and the second dielectric material can be removed. Optionally the hard mask can also be removed before polishing the disc. Alternatively, the disc mask can include a photoresist mask. Alternatively, the hard mask can include at least five (5) layers, or at least six (6) layers. Optionally, the shape of the disc can be further defined using additional masking steps. wherein the step of patterning the hard mask forms a two piece patterned hard mask with a front portion and a back portion forming a void therebetween. In some embodiments, a two piece patterned hard mask can include embodiments where the front portion includes the back edge of the hard mask that functions to define the front edge of the disc and the back portion functions to define the back edge of the disc. Additionally, the sidewalls of the disc can be further defined after deposition of the disc material using a second disc mask. Additionally, further barrier layer can be formed after formation of the disc mask but before deposition of the disc material.

FIGS. 7A to 7I show another illustrative process flow. The steps depicted in FIGS. 7A and 7B, e.g. forming a peg structure 710 on a substrate 702 covered in a first dielectric material 705 and forming a peg 711 are similar and will not be discussed in detail again. Features and characteristics discussed above apply here as well.

Figure 7A:
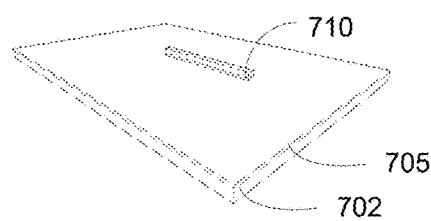
Figure 7B:
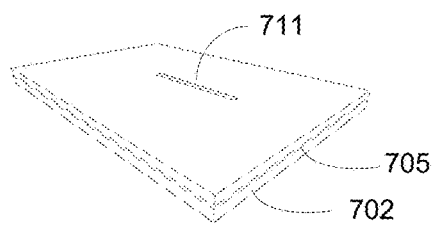
Figure 7C:
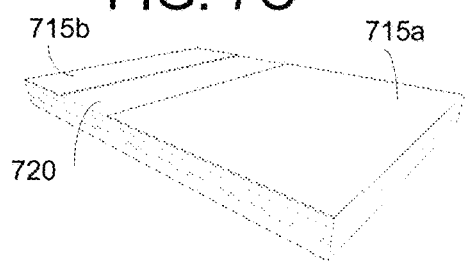

FIG. 7C shows the structure after a hard mask 715 has been deposited thereon and patterned into a front 715a portion and a back 715b portion which form a void 720 therebetween. The front portion 715a functions similarly to the hard mask 615 formed in FIG. 6C and again functions to define the font edge of the disc. The back portion 715b functions to define the back edge of the disc. Use of a single photoresist mask in such a method can improve the control of the critical dimension of the disc in the Y direction. Using more than one mask may reduce control of the critical dimension of the disc in the Y direction but can increase flexibility.

Figure 7D:
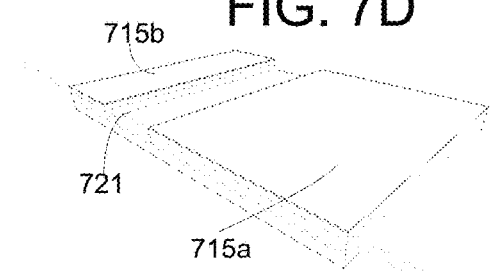

FIG. 7D shows the structure after a removal has been undertaken in the void 720. In some embodiments, an etching step can be utilized. This step can function in the same way as the etching in the step depicted in FIG. 6D above. Specifically, it functions to expose the back edge of the rod. The result of this is a trench 721.

Figure 7E:
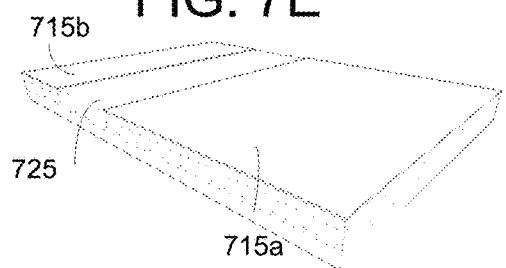

FIG. 7E shows the structure after a sheet film of material has been deposited in the trench 721 and the deposited material and adjacent structure has been subjected to a removal method to remove excess material. An example of such a removal method can include CMP. Because there is no resist material in the structure at this point (versus the structure of FIG. 7E which is utilized to form the disc) deposition under relatively higher temperatures can be utilized. Such may be advantageous because it can allow for higher temperature deposition which may allow for the formation of denser, more uniform material in the trench 721 which can be referred to as the pre-disc material film 725. It should be noted that this method, which allows the use of higher temperature deposition methods may be more advantageous than the optional process method above with the multilayer mask discussed as a corollary to the scheme in FIGS. 6A to 6I because the area being filled with disc material is this embodiment is larger, e.g., it is a trench instead of a smaller via as would be being filled in that process.

Figure 7F:
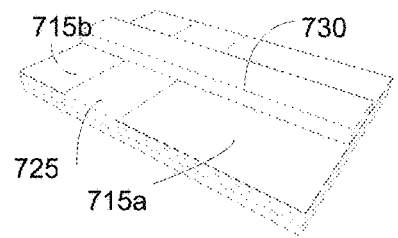

FIG. 7F shows the structure after a disc mask 730 has been formed on top of the structure to define the side walls of the disc. Although the disc mask 730 is shown here as ultimately forming a straight side walled (e.g., similar to that of FIG. 5C) disc, various other structures could be formed using differently configured masks. Various photolithography techniques and methods could be utilized to form the disc mask 730. It should also be noted that additional masking steps (or other types of steps) can also be added in order to provide further definition of the shape of the disc. Such steps could be undertaken at this point, at other points, or any combination thereof. Specific, illustrative examples of such further definition could include, for example removing sharp corners or rounding said corners.

Figure 7G:
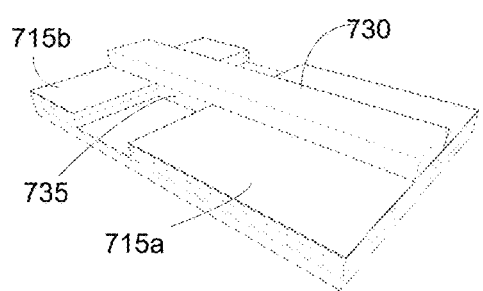

FIG. 7G shows the structure after the disc mask 730 has been utilized to protect the portion of the pre-disc material film 725 that will ultimately become the disc. The remaining pre-disc material can be removed (e.g., etched or milled), for example, using the disc mask 730 to protect the portion of the disc material that should remain to form the disc.

Figure 7H:
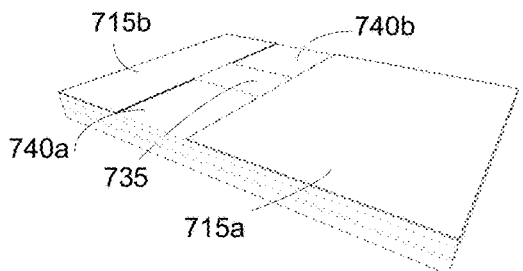

FIG. 7H shows the structure after the disc mask 730 has been removed (e.g., the resist has been stripped), the region in the trench 721 that was previously filled with pre-disc material 725 has been backfilled with a dielectric material 740*a* and 740*b* and the entire structure has been planarized, for example using CMP.

FIG. 7I shows the structure after the hard mask 715*a* and 715*b* have been removed. The resultant structure would be similar to that depicted in FIG. 6J. However, a structure formed using the method depicted in FIGS. 7A to 7I would be able to more critically control the back of the disc 645 and the material of the disc 645 may have different properties (e.g., may be more dense, more uniform, etc.).

FIGS. 8A to 8D offer one illustrative method that may be utilized in combination with other methods to form optional barrier layers. Further details regarding such optional barrier layers can be obtained, for example, in concurrently filed U.S. patent application Ser. Number 15/166,785, entitled NEAR FIELD TRANSDUCERS (NFTS) INCLUDING BARRIER LAYER, filed on May 27, 2016 , the disclosure of which is incorporated herein by reference thereto. For example, the method depicted in FIGS. 8A to 8D may be able to be incorporated into the methods disclosed in FIGS. 6A to 6I, FIGS. 7A to 7I, or both. If an optional barrier layer is to be included, a method as depicted by FIGS. 8A to 8D may be added after the step depicted as completed in FIG. 6D. For example, with 820 being similar to the peg 620 or 621 of FIG. 6D. The remaining portion of the structure of interest includes the dielectric 805 and the hard mask 815. FIG. 8B shows the structure after the material 850 of the optional barrier layer has been deposited over the entire field. Various deposition techniques can be utilized. In some embodiments deposition techniques that are conformal in nature can be utilized. Illustrative conformal techniques can include, for example atomic layer deposition (ALD), chemical vapor deposition (CVD), ion beam deposition (IBD) and others. FIG. 8C depicts a milling process being carried out on the structure and FIG. 8D shows the structure after the milling process, where the only barrier layer material remaining is on the face of the peg 855.

Figure 9A:
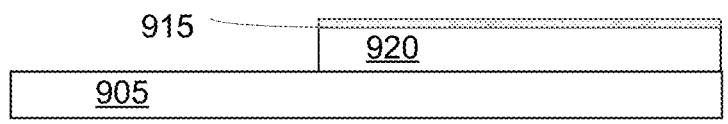
FIGS. 9A to 9E show another illustrative process flow for forming an optional barrier layer.
Figure 9B:
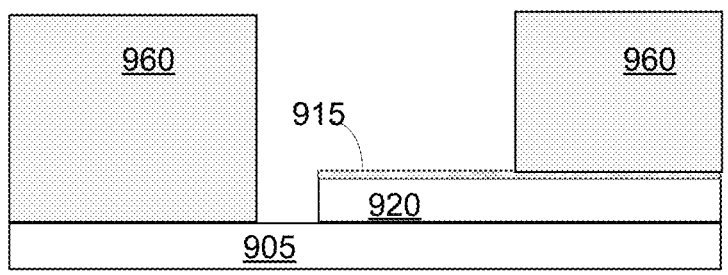
Figure 9C:
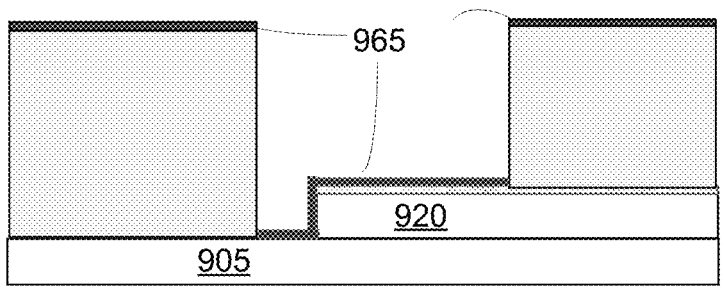
Figure 9D:
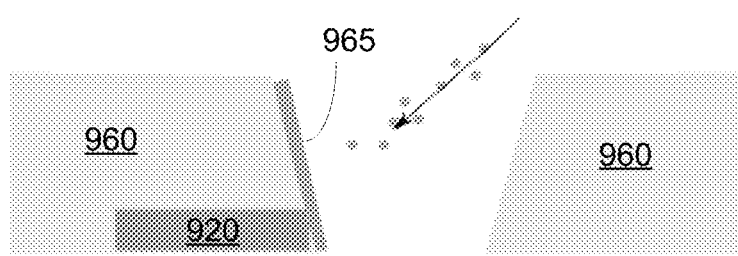
Figure 9E:
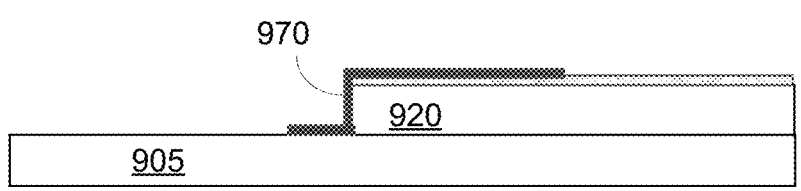

FIGS. 9A to 9D offer another illustrative method that may be utilized in combination with other methods to form optional barrier layers. For example, the method depicted in FIGS. 9A to 9D may be able to be incorporated into the methods disclosed FIGS. 6A to 6I, FIGS. 7A to 7I, or both. If an optional barrier layer is to be included, a method as depicted by FIGS. 9A to 9D may be added after the step depicted as completed in FIG. 6D. For example, with 920 being similar to the peg 620 or 621 of FIG. 6D. The remaining portion of the structure of interest includes the dielectric 905 and the hard mask 915. FIG. 9B shows the structure after the next step, formation of a mask 960. The mask 960 is designed to leave only the desired amount of the dielectric 905 behind the peg 920 exposed so that the barrier layer may be deposited thereon. FIG. 9C shows the structure after an optional barrier layer material 965 has been deposited thereon. FIG. 9D shows an optional method of depositing the optional barrier layer material within the region exposed by the mask. The method depicted in FIG. 9D includes deposition at an angle relative to the surface of the structure. Such a method could afford more uniform, more conformal, or a combination thereof deposition of the barrier material on the face of the peg. FIG. 9D should be understood as an alternative to that depicted in FIG. 9D. FIG. 9E shows the structure after the mask has been removed and the optional barrier layer 970 exists only in the portions where it is desired. It should be noted that the optional barrier layer could cover more or less of the dielectric 905, more or less of the hard mask 915, or combinations thereof.

FIGS. 10A to 10D offer another illustrative method that may be utilized in combination with other methods to form optional barrier layers. For example, the method depicted in FIGS. 10A to 10D may be able to be incorporated into the methods disclosed in FIGS. 6A to 6I, FIGS. 7A to 7I, or both. If an optional barrier layer is to be included, a method as depicted by FIGS. 10A to 10D may be added after the step depicted as completed in FIG. 6D. For example, with 1020 being similar to the peg 620 or 621 of FIG. 6D. The remaining portion of the structure of interest includes the dielectric 1005 and the hard mask 1015. As seen in this structure, the peg 1020 is connected to a source of electrical current in order to provide current for electroplating. FIG. 10B shows the structure after barriers 1080 are formed on the structure so that the plating solution can be contained within the area of interest. The plating solution is indicated as filling up the volume formed by the barriers up to the line (which is entirely arbitrary). FIG. 10C shows the structure once the current has been turned on and the barrier layer 1085 is forming. The barrier layer 1085 will form only on the exposed end of the peg 1020 because the hard mask 1015 will insulate the underlying remaining portion of the peg 1020. FIG. 10D shows the structure after the barriers 1080 are removed.

FIGS. 11A and 11B illustrate different back surfaces of the peg that can be incorporated into NFTs formed herein. FIG. 11A shows an arced 1122 back surface of a peg. This can be contrasted with the flat 1124 back surface of the peg seen in FIG. 11B. There may be some instances when the flat back surface 1124 of the peg may not be desirable even though it is thought that minimizing peg volume, providing a smoother front edge of the disc, or both are advantageous. In such circumstance, the removal step that exposes the back of the peg from the dielectric and hard mask can be tailored to obtain a desired profile. This can be accomplished by changing hardmasks/materials/thickness/mill/etch conditions or any combination thereof.

Barrier layers such as those disclosed above can have thicknesses that need not be the same in the entire structure, e.g., the barrier layer can have a first thickness in one location and a second thickness in a second location (and so on). In some embodiments barrier layers can have a thickness that is not less than 2 nanometers (nm), not less than 5 nm, not less than 10 nm, not less than 15 nm, or not less than 20 nm. In some embodiments barrier layers can have a thickness that is not greater than 50 nm, not greater than 45 nm, not greater than 40 nm, or not greater than 35 nm.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of near field transducers (NFTs) and methods of forming the same are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method of forming a NFT, the NFT comprising a disc and a peg, the peg being a portion of a rod, the method comprising:
    forming the rod, the rod substantially surrounded on the sides by a dielectric material, the rod comprising the peg;
    forming a hard mask positioned over at least a portion of the rod, the hard mask comprising at least one layer;
    patterning a resist mask over the hard mask, the resist mask having an edge positioned over at least a portion of the rod;
    etching a portion of the hard mask to expose a back edge of the rod and to form a back edge of the hard mask, wherein the back edge of the rod is equivalent to the back edge of the peg; and wherein a forward portion of the rod which is the portion of the rod forward of the back edge is covered by the hard mask;
    forming a disc mask comprising a void configured to form a disc of a NFT, the disc mask being formed over at least a portion of the hard mask so that the exposed back edge of the rod is within the void configured to form the disc;
    etching an area exposed in the void of the disc mask to remove both a rear portion of the rod and the surrounding dielectric up to the back edge of the hard mask edge;
    depositing a disc material in the etched void, wherein the back edge of the hard mask defines the front edge of the disc and the back edge of the rod is in contact with the front edge of the disc; and
    polishing the deposited disc material to form a top surface substantially planar with the top of the forward rod portion.

2. The method according to claim 1 further comprising removing the disc mask after the disc material has been deposited in the void.

3. The method according to claim 2 further comprising depositing a second dielectric material over at least the disc material.

4. The method according to claim 3 further comprising removing at least a portion of the disc material and second dielectric material.

5. The method according to claim 4 further comprising removing the hard mask before polishing the disc.

6. The method according to claim 1, wherein the disc mask comprises a photoresist mask.

7. The method according to claim 1, wherein the hard mask comprises at least five (5) layers.

8. The method according to claim 1 further comprising further defining the shape of the disc using additional masking steps.

9. The method according to claim 1, wherein the step of patterning the hard mask forms a two piece patterned hard mask with a front portion and a back portion forming a void therebetween.

10. The method according to claim 9, wherein the front portion comprises the back edge of the hard mask that functions to define the front edge of the disc and the back portion functions to define the back edge of the disc.

11. The method according to claim 10 further comprising defining the sidewalls of the disc after deposition of the disc material using a second disc mask.

12. The method according to claim 1 further comprising forming a barrier layer after formation of the disc mask but before deposition of the disc material.

13. The method according to claim 12, wherein the barrier layer is plated.

14. A method of forming a NFT, the NFT comprising a disc and a peg, the peg being a portion of a rod, the method comprising:
    forming the rod, the rod substantially surrounded on the sides by a dielectric material, the rod comprising the peg;
    forming a hard mask positioned over at least a portion of the rod, the hard mask comprising at least one layer;
    patterning a resist mask over the hard mask, the resist mask having an edge positioned over at least a portion of the rod;
    etching a portion of the hard mask to expose a back edge of the rod and to form a back edge of the hard mask, wherein the back edge of the rod is equivalent to the back edge of the peg; and wherein a forward portion of the rod which is the portion of the rod forward of the back edge is covered by the hard mask;
    forming a disc mask comprising a void configured to form a disc of a NFT, the disc mask being formed over at least a portion of the hard mask so that the exposed back edge of the rod is within the void configured to form the disc;
    etching an area exposed in the void of the disc mask to remove both a rear portion of the rod and the surrounding dielectric up to the back edge of the hard mask edge;
    forming a barrier layer adjacent at least the back edge of the rod;
    depositing a disc material in the etched void, wherein the back edge of the hard mask defines the front edge of the disc and the back edge of the rod is in contact with the front edge of the disc; and
    polishing the deposited disc material to form a top surface substantially planar with the top of the forward rod portion.

15. The method according to claim 14, wherein the disc mask comprises a multilayer hard mask.

16. The method according to claim 14, wherein the step of forming the barrier layer comprises use of a conformal deposition technique.

17. The method according to claim 15, wherein the step of forming the barrier layer comprises use of a plating technique.

18. A device having an air bearing surface (ABS), the device comprising:
    a NFT, the NFT comprising:
    a disc having a front edge positioned towards the ABS of the device and an opposing back edge and a top surface and an opposing bottom surface; and
    a peg having a front surface adjacent the ABS of the device and an opposing back surface and a top surface and an opposing bottom surface,
    wherein the bottom surface of the peg is from about 5 nm to 20 nm above the bottom surface of the disc.

19. The device according to claim 18 further comprising a barrier layer positioned between the front edge of the disc and the back edge of the peg.

20. The device according to claim 19, wherein the barrier layer has a thickness from about 5 nm to about 50 nm.

* * * * *